April 23, 1968 W. J. BRUDER 3,379,594
HONEYCOMB FABRICATION
Filed Oct. 24, 1963 2 Sheets-Sheet 1
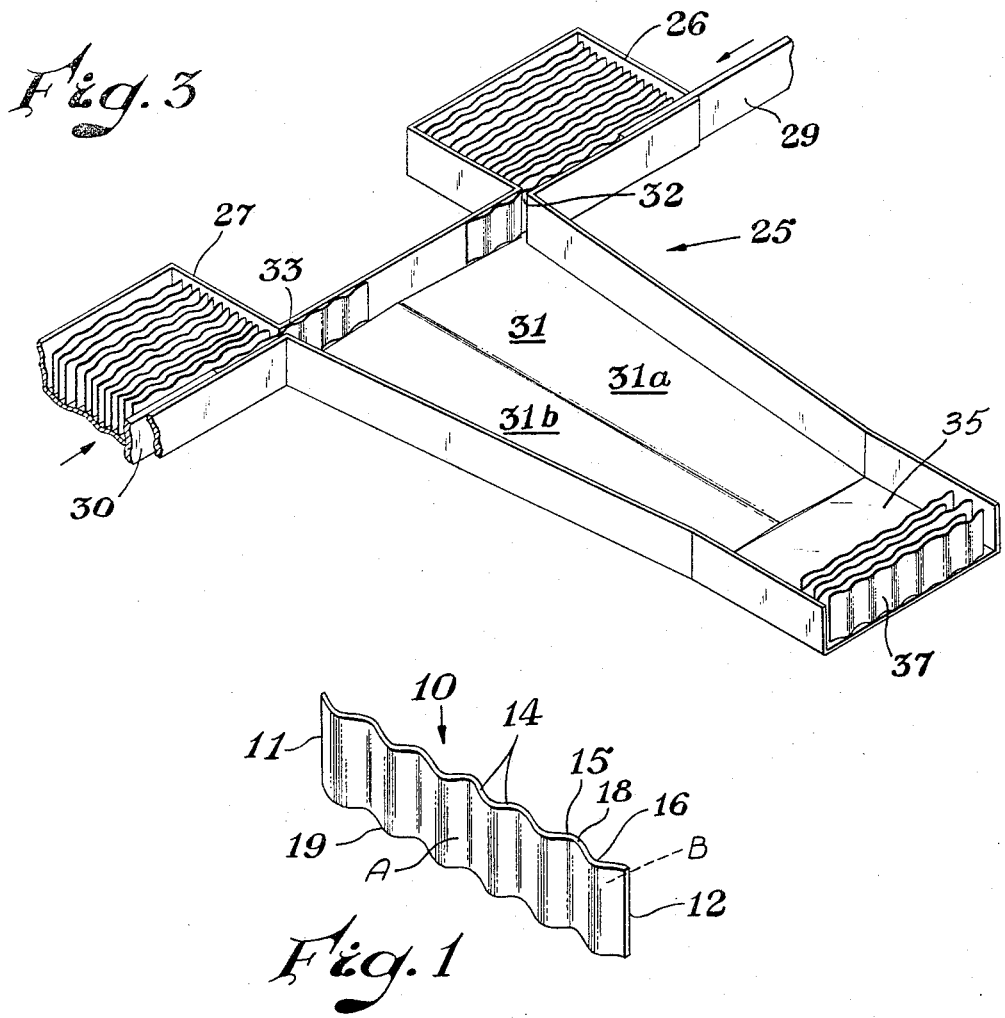
Fig. 3
Fig. 1
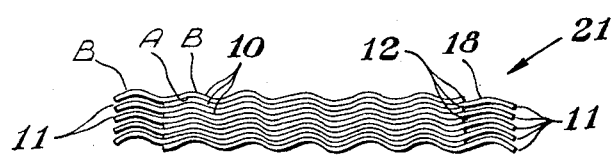
Fig. 2
INVENTOR.
Wallace J. Bruder
BY Robert Ingraham
AGENT

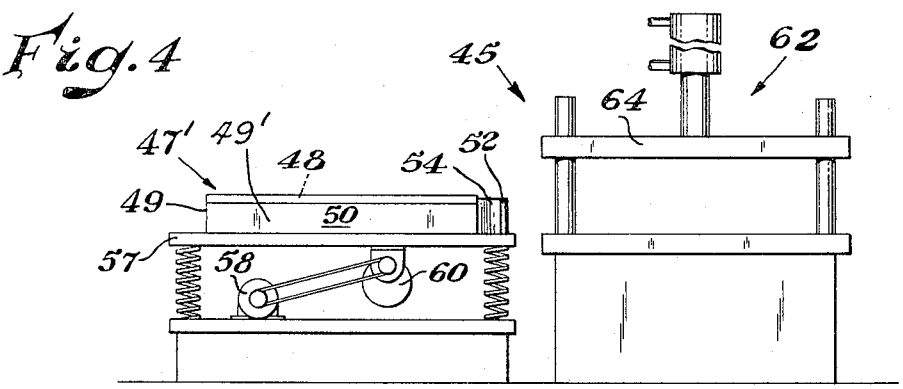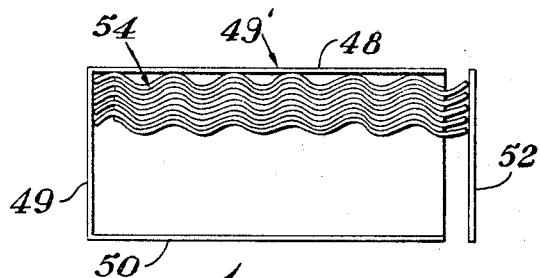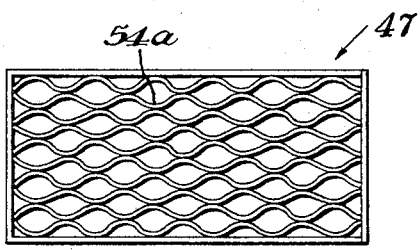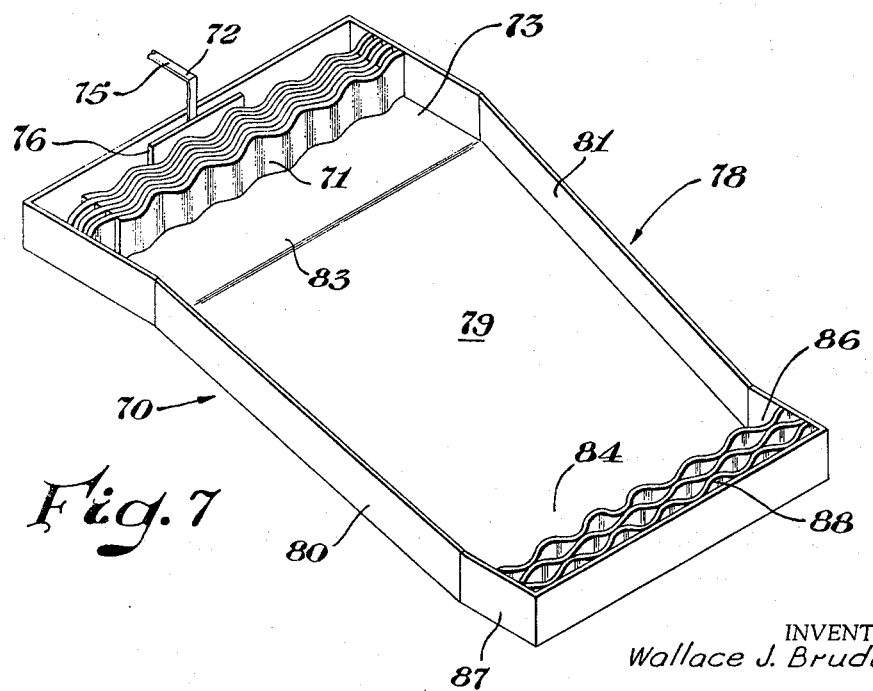

United States Patent Office 3,379,594
Patented Apr. 23, 1968

3,379,594
HONEYCOMB FABRICATION
Wallace J. Bruder, Midland, Mich., assignor to The Dow Chemical Company, Midland, Mich., a corporation of Delaware
Filed Oct. 24, 1963, Ser. No. 318,582
8 Claims. (Cl. 156—292)

This invention relates to honeycomb fabrication and, more particularly, relates to a method and apparatus for preparing rigidizing thermoplastic, resinous, honeycomb core.

There are many applications for the use of a honeycomb core material prepared from a thermoplastic, resinous sheet, such as, for example, honeycomb material such as is set forth in U.S. Patent 3,007,834. Material of this nature is beneficially utilized for the fabrication of structural panels, as cores in laminated structures and as packing materials in gas-liquid contact apparatus, such as cooling towers and the like. The preparation of large quantities of such material from thermoplastic-resinous strip has required a relatively large number of operations and oftentimes such operations are relatively slow.

Due to the high bulk of the fabricated honeycomb, it is desirable that the honeycomb be shipped in the lowest possible volume package and subsequently expanded to its desired dimension at the location where it is to be used. When assembling such honeycomb, it is desirable that the assembly be made as rapidly as possible and with the least possible manipulation and yet the apparatus for carrying out such an operation should be relatively simple, light and preferably, in many cases, readily portable. The honeycomb material should be assembled from the shipping package in as few operations as possible and with a minimum of equipment.

It is an object of this invention to provide an improved method of assembling a honeycomb core material.

It is another object of this invention to provide an improved shipping package for the preparation of thermoplastic, resinous honeycomb core material.

Another object of the invention is to provide a method of packaging, assembling and rigidizing honeycomb core material.

These benefits and other advantages, in accordance with the present invention, are readily achieved by assembling a plurality of corrugated, thermoplastic, resinous strips, said strips being placed in generally parallel relationship with their major faces generally adjacent and positioning alternate strips in such a manner that they differ from adjacent strips by one-half of a corrugation, as measured from a terminal end portion thereof, straining said strips in an endwise direction forcing them into a configuration having at least one end of the group of strips a plane containing the terminal portions of the strips, maintaining the corrugated strips in generally closed adjacent relationship and subsequently heating the edge portions of the strips to a temperature sufficiently high to permit plastic flow and joining of the strips and subsequently cooling the strips below the plastic flow temperature.

Further features and other advantages of the invention will become more apparent upon examination of the following specification taken in connection with the drawing wherein:

FIGURE 1 depicts a corrugated thermoplastic, resinous strip.

FIGURE 2 is an edge view of a package of strips, such as is shown in FIGURE 1.

FIGURE 3 represents an apparatus for the formation of packages of FIGURE 2.

FIGURE 4 is an apparatus for the formation of a rigidized, honeycomb core.

FIGURES 5 and 6 are details of portions of the apparatus of FIGURE 4.

FIGURE 7 is a schematic representation of an alternate apparatus for assembly of a honeycomb.

In FIGURE 1 there is illustrated a thermoplastic, resinous strip generally designated by the reference numeral 10. The strip 10 has end portions 11 and 12. The strip 10 also has a plurality of corrugations 14. Each of the corrugations 14 has a peak 15 and a trough 16. The strip 10 is terminated by the edge portions 18 and 19. The face of the strip toward the viewer is designated as A and the hidden face as B.

In FIGURE 2 there is a plan view of a package 21 which comprises a plurality of strips 10 wherein alternate strips are in a reverse or out-of-place configuration. That is the uppermost strip 10 has an end 11 lying to the left and adjacent to it is a strip 10 with end 12 lying to the left. In viewing the package from the edge, one alternately sees the edges 18 and 19. The adjacent strips are arranged in peak-to-trough relationship with adjacent faces A and adjacent faces B in generally contiguous relationship.

FIGURE 3 depicts a schematic representation of an apparatus 25 suitable for the preparation of bundles or packages such as the bundle or package 21 of FIGURE 2. The apparatus 25 comprises a first feed tray 26 and a second feed tray 27. The feed tray 26 and feed tray 27 have in operative association therewith a strip ejecting means 29 and 30, respectively. The feed trays 26 and 27 are in operative communication with a stacking trough 31 by means of the openings 32 and 33, respectively. The bottom of the stacking trough 31 comprises two portions 31a and 31b which slope downwardly and outwardly from the center and maintain the strips adjacent the edges of the trough adjacent the feed tray from which they were ejected. The stacking trough 31 terminates in a bundle receiving basket 35 within which there is disposed a bundle 37.

FIGURE 4 is a schematic representation of an apparatus generally designated by the reference numeral 45. The apparatus 45 comprises a honeycomb assembly device 47. The honeycomb assembling device 47 comprises a tray 49' having three rigid sides 48, 49 and 50 and one displaceable side 52. Contained with the honeycomb former is a bundle 54 similar to the bundle 21 of FIGURE 2. FIGURE 5 is a top view of the tray 49'. The honeycomb former 47 is supported by a vibrating table 57. Vibrating table 57 is oscillated by means of motor 58 and operating in conjunction with the eccentric 60. Immediately adjacent the honeycomb former 47 is a platen press 62. The press 62 is provided with a stationary heating platen and a moveable heating platen 64.

In FIGURE 6 there is illustrated a top view of the tray 49 of FIGURES 4 and 5 when the moveable side 52 has been moved inwardly to form a honeycomb configuration 54a from the bundle 54.

In FIGURE 7 there is schematically illustrated an alternate apparatus generally designated by the reference numeral 70 for the assembly of a bundle 71. The apparatus 70 comprises a bundle receiver 73 having in operative association therewith a bundle forwarding apparatus 75. The bundle forwarding apparatus 75 comprises a pad or shoe 76 adapted to engage one side of the bundle 71 and a pad operating means 72. In full communication with the bundle receiver 73 is a sloping, tapering trough 78. The trough 78 comprises a bottom 79 and side portions or guides 80 and 81. The trough 78 has a bundle inlet end 83 and a bundle outlet end 84. A honeycomb receiver 86 is positioned adjacent to and in communication with the bundle discharge end 84 of the sloping tapered trough 78. The honeycomb receiver 86 is provided with a flange 87 on 3 sides thereof. The flange 87 defines a space into which an assembled honeycomb 88 is fitted. In operation of the apparatus of FIGURE 7, a bundle 71 in accordance with the invention is placed in the bundle receiver 73. The strips comprising the bundle 71 are not secured to each other. The bundle 71 is then slowly forced forward, that is, to the end 83 of the trough 78. The individual strips comprising the bundle move down the trough 78 under the influence of gravity and their end portions brought into coplanar relationship by the converging sides 80 and 81 of the trough 78. A bundle 71 when forced onto the sloping tapering trough forms an assembled honeycomb 88 when it reaches the honeycomb receiver 86. The assembled bundle or honeycomb 88 may then be conveniently operated on by heating platens or transferred to heating platens such as are employed in the arrangement of FIGURE 4.

The thermoplastic strips for use in the practice of the present invention can be prepared from a wide variety of materials. Typical are polystyrene, polyvinyl chloride, polyethylene, polypropylene, polytetrafluoroethylene and all other sheet formable thermoplastic polymeric or copolymeric materials. Advantageously conventional fillers, pigments and stabilizers may be incorporated therein. Corrugated strips, in accordance with the present invention, are readily prepared by a wide variety of means well known to the art including the initial formation of a flat sheet and subsequent vacuum forming to a corrugated configuration, extrusion of the sheet as a corrugated sheet, molding and the like. The corrugated sheets may subsequently be cut into strips of the desired width.

Shipping bundles, in accordance with the present invention, are also readily prepared by taking the desired number of corrugated strips, rotating alternate strips about an axis generally parallel to the general plane of the strip and longitudinal axis thereof, positioning the strips in peak-to-trough relationship wherein each sheet is displaced from the opposite sheet by one-half a corrugation and the ends of alternate sheets are generally adjacent to each other and separated at one end by a strip positioned between the alternate strips. Such bundles are readily prepared using the desired number of strips which will form a honeycomb of the particular desired dimension.

The apparatus of FIGURE 3 is particularly beneficial and advantageous for the preparation of such bundles. For example, a corrugated sheet is cut into a plurality of strips wherein the corrugations are in the transverse direction of the sheet, the corrugated strips are stacked in nesting relationship (i.e. face A to B). Two groups having approximately equal numbers of such strips are selected. One group of such strips is placed in the feed tray, such as 27, the other group is inverted that is rotated about 180° about an axis generally parallel to the general longitudinal axis of the strips and placed in a feed tray 26. The ejectors, such as the ejectors 32 and 33, are adjusted to deliver alternately strips from each of the two feed trays which are then free to slide down the stacking trough 31 into the stacking tray 35, forming the bundle 37 which may be secured by a suitable tape or other tie or transferred directly to a shipping container.

To form the bundles, such as the bundles 21 and 37, into the desired honeycomb, a bundle is placed in an assembly tray, such as the tray 49' of FIGURES 4, 5 and 6, the tray is gently vibrated with pressure being applied to the protruding end portions of the strips of the bundle and the strips then assume a trough-to-peak relationship as in the finished honeycomb, as is illustrated in FIGURE 6. The strips are then permanently secured together either by flanging as shown in FIGURE 4 or by inclusion in a laminate by adhesives.

An alternate method of assembling the bundles, such as the bundles 21 and 37, is to utilize a honeycomb forming trough generally similar to the trough 31 of FIGURE 3. This trough at one end is sufficiently wide to receive the bundle, such as 31, and at the opposite end is only sufficiently wide to accept the completed honeycomb. Thus, by utilizing a tapering or tapering vibrating trough, bundles in accordance with the invention are readily forced to conform to the configuration of the trough and be positioned in trough-to-peak relationship as in the honeycomb forming tray 49' of FIGURE 4. An alternate technique is to dispense with the vibration of the trough and place its broader end at a level above its smaller end sufficient that the corrugated strips slide down an inclined plane and are positioned by the converging sides of the trough.

By way of further illustration, polystyrene corrugated strips approximately 2 inches in width and having a corrugation wave length of about 3 inches and a linear length of about 36 inches are readily assembled into honeycomb configurations utilizing a vibrating tray, such as is illustrated in FIGURE 4 and also by utilizing the gravity slide hereinbefore described. The assembled honeycomb configurations are readily secured into a rigid assembly by the application of heat to the edge portion to cause the strips to flow together at the edges and subsequent cooling thereof.

As is apparent from the foregoing specification, the method and apparatus of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of assembling a honeycomb structure comprising
providing a package of a plurality of corrugated thermoplastic resinous strips, the strips having major faces, sides and ends, said strips being placed in generally parallel relationship with major faces of the strips generally adjacent, alternate strips positioned in such a manner that they differ from adjacent strips by one-half of a corrugation, subsequently arranging in adjacent relationship a desired number of strips,
placing a strain on the ends of the strips forming the package and thereby
forcing the corrugated strips into a configuration where at least one end of the group of strips there is a plane generally containing the adjacent ends of adjacent strips,
maintaining the corrugated strips in generally closely adjacent relationship whereby a plurality of spaces are defined between adjacent strips and subsequently
maintaining said strips in fixed relationship to each other by heating the edge portions of the strips to a temperature sufficiently high to permit plastic flow and joining of the strips and subsequently cooling the strips below the plastic flow temperature.

2. A method of assembling a honeycomb structure comprising
providing a package of a plurality of corrugated thermoplastic resinous strips, the strips having edges, ends and major faces, said strips being positioned in generally parallel relationship with major faces of the strips generally adjacent,
and alternating the strips in such a manner that they differ from adjacent strips by one-half of a corrugation, subsequently arranging a desired number of strips in adjacent relationship,
placing a strain on the ends of the strips and thereby
forcing the corrugated strips into a configuration where at each end of the group of strips there is a plane generally containing the adjacent ends of the strips whereby a plurality of spaces are defined between each adjacent strip, maintaining the corrugated strips in generally closely adjacent relationship and subsequently joining the contiguous edge portions of the strips.

3. A method of assembling a honeycomb structure comprising providing a plurality of like corrugated thermoplastic resinous strips, each of the strips having major faces, sides and ends, positioning said strips in two groups, each of said groups differing by a phase relationship of approximately 180°, alternately placing strips from each group in adjacent relationship with their major faces substantially parallel and at least one of the adjacent ends lying in a plane, subsequently heating the edges of the strips to a temperature sufficiently high to permit plastic flow and joining of the strips and subsequently cooling edge portions of the strips below the plastic flow temperature.

4. A bundle of corrugated thermoplastic resinous strips having generally the same length and identical corrugations, said bundle having alternate strips having a phase difference of one-half of a corrugation, said strips being in face-to-face generally contiguous relationship with adjacent strips.

5. A bundle of corrugated thermoplastic resinous strips having generally the same length and identical corrugations, said bundle having alternate strips having a phase difference of one-half of a corrugation, and said strips being in face-to-face relationship to each other, and means to maintain said strips in face-to-face generally contiguous relationship.

6. An apparatus for the assembly of a bundle of corrugated thermoplastic resinous strips into a honeycomb structure, the strips having generally identical corrugations, the bundle having alternate strips which have a phase difference of one-half of a corrugation, the strips being in face-to-face relationship with adjacent strips, the apparatus comprising in cooperative combination a vibrating tray adapted to receive the bundle, said tray having at least one movable side, means to move said movable side and maintain it in engagement with the terminal portion of a bundle, means to forward and expand the bundle in cooperative combination with means to heat the edge portions of the bundle to a temperature sufficiently high to permit plastic flow and to join the strips together.

7. An apparatus for the assembly of a bundle of corrugated thermoplastic resinous strips having generally identical corrugations, the bundle having alternate strips having a phase difference of one-half a corrugation and the strips being in face to face relationship to each other, the apparatus comprising in cooperative combination means to receive a bundle of said strips to apply a force to the end portions of said strips sufficient to bring said ends into a generally planar configuration, thus forming the strips into a honeycomb configuration.

8. An apparatus for the assembly of a bundle of corrugated thermoplastic resinous strips having generally identical corrugations, the bundle having alternate strips having a phase difference of one-half of a corrugation, and said strips being in face to face relationship to each other, said apparatus comprising a bundle receiver in communication with a sloping trough, said bundle receiver being of sufficient width to receive said bundle when oriented in a direction substantially normal to the longitudinal axis of said trough, means to force said bundle into the trough, the trough tapering into a honeycomb receiver having a width slightly in excess of the length of a corrugated strip, the trough being disposed at an angle sufficient to permit the force of gravity to carry a strip from the bundle receiver to the honeycomb receiver, the trough being formed so that each strip is carried down the trough while disposed generally transverse to the longitudinal axis of the trough.

References Cited

UNITED STATES PATENTS

| | | | |
|---|---|---|---|
| 3,227,599 | 1/1966 | Holland | 161—68 |
| 3,007,834 | 11/1961 | Moeller et al. | 161—68 X |
| 3,035,961 | 5/1962 | Jones et al. | 156—510 X |
| 2,949,689 | 8/1960 | Vida | 161—39 X |
| 3,150,022 | 9/1964 | Vida | 156—552 X |

EARL M. BERGERT, *Primary Examiner.*

H. F. EPSTEIN, *Assistant Examiner.*